US009388310B2

(12) United States Patent
van Gisbergen et al.

(10) Patent No.: US 9,388,310 B2
(45) Date of Patent: Jul. 12, 2016

(54) FLOW ENHANCED THERMOPLASTIC COMPOSITIONS AND METHODS FOR ENHANCING THE FLOW OF THERMOPLASTIC COMPOSITIONS

(71) Applicants: Josephus Gerardus M. van Gisbergen, Bergen op Zoom (NL); Chris van der Weele, Sommelsdijk (NL); Sreepadaraj Karanam, Bergen op Zoom (NL); Mark Adrianus Johannes van der Mee, Breda (NL)

(72) Inventors: Josephus Gerardus M. van Gisbergen, Bergen op Zoom (NL); Chris van der Weele, Sommelsdijk (NL); Sreepadaraj Karanam, Bergen op Zoom (NL); Mark Adrianus Johannes van der Mee, Breda (NL)

(73) Assignee: SABIC GLOBAL TECHNOLOGIES B.V. (NL)

(*) Notice: Subject to any disclaimer, the term of this patent is extended or adjusted under 35 U.S.C. 154(b) by 0 days.

(21) Appl. No.: 14/598,605

(22) Filed: Jan. 16, 2015

(65) Prior Publication Data
US 2015/0126664 A1 May 7, 2015

Related U.S. Application Data

(62) Division of application No. 13/130,436, filed as application No. PCT/IB2009/054619 on Oct. 20, 2009, now Pat. No. 8,946,332.

(60) Provisional application No. 61/106,826, filed on Oct. 20, 2008.

(51) Int. Cl.
*C08L 69/00* (2006.01)
*C08K 3/00* (2006.01)

(52) U.S. Cl.
CPC .............. *C08L 69/00* (2013.01); *C08K 3/0008* (2013.01); *C08K 2201/014* (2013.01); *C08L 2201/02* (2013.01); *C08L 2205/025* (2013.01); *C08L 2205/035* (2013.01); *C08L 2207/53* (2013.01)

(58) Field of Classification Search
CPC ....................................................... C08L 69/00
USPC ....................................................... 524/401
See application file for complete search history.

(56) References Cited

U.S. PATENT DOCUMENTS

| 4,267,095 | A | 5/1981 | Del Valle |
| 4,344,878 | A | 8/1982 | Dolce |
| 4,810,739 | A | 3/1989 | Lindner et al. |
| 5,159,003 | A | 10/1992 | Baghaii |
| 5,958,361 | A | 9/1999 | Laine et al. |
| 2005/0113493 | A1 | 5/2005 | Persigehl et al. |
| 2006/0276587 | A1 | 12/2006 | Hong et al. |
| 2007/0282040 | A1 | 12/2007 | Ai et al. |
| 2008/0242789 | A1* | 10/2008 | Zhu ........................ C08L 67/02 524/451 |
| 2009/0111943 | A1* | 4/2009 | Bhat ....................... C08L 51/04 525/105 |

FOREIGN PATENT DOCUMENTS

| JP | 04-345655 | * 12/1992 |
| JP | 7082433 A | 3/1995 |

OTHER PUBLICATIONS

Derwent abstract of JP 04-345655 (1993).*
International Preliminary Report on Patentability and Written Opinion for International Application No. PCT/IB2009/054619, Date of Issuance Apr. 26, 2011, Date of WO mailing: Jan. 20, 2010, 9 pages.
International Search Report for International Application No. PCT/IB2009/054619, Application Filing Date: Oct. 20, 2009, Date of Mailing: Jan. 20, 2010, 7 pages.

* cited by examiner

*Primary Examiner* — Doris Lee
(74) *Attorney, Agent, or Firm* — Cantor Colburn LLP

(57) ABSTRACT

A composition that contains from 30 to 95 wt. %, based on the total weight of the composition, of a thermoplastic component and an effective amount of a flow-enhancing component. The effective amount of the flow-enhancing component reduces the viscosity of the composition by at least 10% compared to the viscosity of a composition comprising the thermoplastic component, but not an effective amount of the flow-enhancing component. The thermoplastic component is selected from the group consisting of polycarbonates, polyesters, and combinations thereof. The flow-enhancing component comprises b1) a component selected from the group consisting of metal oxides, metalloid oxides, metal alkoxides, metalloid alkoxides, and combinations thereof and b2) a mineral filler component. The weight ratio of component b1) to component b2) ranges from 1:25 to 25:1. A method for enhancing the flow of compositions comprising thermoplastic components is also disclosed.

5 Claims, No Drawings

FLOW ENHANCED THERMOPLASTIC COMPOSITIONS AND METHODS FOR ENHANCING THE FLOW OF THERMOPLASTIC COMPOSITIONS

This Application claims the benefit of Provisional application U.S. Ser. No. 61/106,826 filed on Oct. 20, 2008 and claims priority to PCT Application No. PCT/IB2009/054619 filed on Oct. 20, 2009 and is a divisional application of U.S. patent application Ser. No. 13/130,436 filed on Feb. 9, 2012.

BACKGROUND OF THE INVENTION

1. Field of the Invention

This disclosure relates generally to enhancing the flow properties of compositions comprising thermoplastic components, and in particular to enhancing the flow properties of compositions comprising thermoplastic components and flame retardant components.

2. Description of the Related Art

For many electrical or electronic applications, thermoplastic polymer compositions need to meet specific flame retardancy (FR) requirements, such as UL-94 V0 or V1. Attempts have been made to improve the flame retardancy of such compositions by adding a bromine-containing polymer in combination with a synergist such as antimony oxide ($Sb_2O_3$). Attempts have also been made to eliminate the dripping of flames by adding small amounts of polytetrafluoroethylene (PTFE) to thermoplastic polymer compositions.

However, each of these attempts to improve flame retardancy or to meet flame retardancy requirements suffers from one or more of poor flow, which is not admitted to have been known in the art by inclusion in this section. Even partial bromination increases the stiffness of the polymer chains, thereby increasing the glass transition temperature of the polymer and generally lowering the flow properties of compositions containing the flame retardant additive(s) (the FR package) compared to the original composition. The flow properties, in particular the viscosity, of compositions comprising thermoplastic polymer components affect the processability of the composition. Therefore, enhancing the flow properties of compositions comprising thermoplastic polymer components, and especially compositions comprising thermoplastic polymer components and brominated polymers, would be highly desirable.

BRIEF SUMMARY OF THE INVENTION

The present invention is directed to compositions and methods that satisfy the need for enhancing the flow properties of compositions comprising thermoplastic polymer components.

In one embodiment, a composition comprises: a) from 30 to 95 wt. %, based on the total weight of the composition, of a thermoplastic polymer component, and b) an effective amount of a flow-enhancing component. The thermoplastic polymer component is selected from the group consisting of polycarbonates, polyesters, and combinations thereof. The flow-enhancing component comprises b1) a component selected from the group consisting of metal oxides, metalloid oxides, metal alkoxides, metalloid alkoxides, and combinations thereof, and b2) a mineral filler component. The weight ratio of component b1) to component b2) ranges from 1:25 to 25:1. The effective amount of the flow-enhancing component is sufficient to reduce the viscosity of the composition by at least 10% compared to the viscosity of the same composition comprising component a), but not comprising an effective amount of component b).

Another embodiment relates to a composition comprising: a) from 20 to 50 wt. %, based on the total weight of the composition, of bisphenol-A polycarbonate resin; b) from 10 to 45 wt. %, based on the total weight of the composition, of polybutylene terephthalate; c) from 3 to 20 wt. %, based on the total weight of the composition, of a mineral filler; d) from 3 to 15 wt. %, based on the total weight of the composition, of a core-shell impact modifier; e) from 5 to 30 wt. %, based on the total weight of the composition, of an at least partially brominated polymer; f) from 1 to 10 wt. %, based on the total weight of the composition, of antimony oxide; and g) from 0 to 5 wt. %, based on the total weight of the composition, of a polytetrafluoroethylene-containing polymer component.

Still another embodiment relates to a method for enhancing the flow of a composition comprising from 30 to 95 wt. %, based on the total weight of the composition, of a thermoplastic polymer component selected from the group consisting of polycarbonates, polyesters, and combinations thereof. The method comprises adding an effective amount of a flow-enhancing component to the composition, wherein the flow-enhancing component comprises: i) a component selected from the group consisting of metal oxides, metalloid oxides, metal alkoxides, metalloid oxides, and combinations thereof, and ii) a mineral filler component, wherein the weight ratio of component i) to component ii) ranges from 1:25 to 25:1. The method reduces the viscosity of the composition by at least 10%.

These and other features, aspects, and advantages of the present invention will become better understood with reference to the following description and appended claims.

DETAILED DESCRIPTION OF THE INVENTION

The present invention may be understood more readily by reference to the following detailed description of preferred embodiments of the invention as well as to the examples included therein. In the following detailed description and in the claims which follow, reference will be made to a number of terms which shall be defined to have the following meanings:

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

It has been surprisingly discovered that the flow properties of compositions comprising a thermoplastic polymer component selected from the group consisting of polycarbonates, polyesters, and combinations thereof, can be enhanced by adding an effective amount of a flow-enhancing component comprising a component selected from the group consisting of metal oxides, metalloid oxides, metal alkoxides, metalloid alkoxides, and combinations thereof, and a mineral filler component. In one embodiment, the flow-enhancing component is sufficient to reduce the viscosity of the composition by at least 10%. The thermoplastic polymer component can be present in the flow-enhanced composition in an amount of from 30 to 95 weight percent (wt. %), based on the total weight of the composition.

The flow-enhanced compositions preferably further comprise a combination of an FR package, because for many electrical or electronic applications, thermoplastic polymer compositions need to pass specific FR requirements, such as the standard set forth by Underwriter's Laboratories UL-94 V0 or V1. Flame retardant thermoplastic polymer compositions, with and without impact modifier, are popular materials for electrical and electronic applications. In order to obtain FR thermoplastic polymer compositions with enhanced modulus/stiffness, an FR package can be added to a reinforced composition, in the current case using mineral fillers.

In one embodiment, a composition comprises a) from 30 to 95 wt. %, based on the total weight of the composition, of a thermoplastic polymer component selected from the group consisting of polycarbonates, polyesters, and combinations thereof, and b) an effective amount of a flow-enhancing component comprising: b1) a component selected from the group consisting of metal oxides, metalloid oxides, metal alkoxides, metalloid alkoxides, and combinations thereof, and b2) a mineral filler component, wherein the weight ratio of component b1) to component b2) ranges from 1:25 to 25:1, and wherein the effective amount of the flow-enhancing component is sufficient to reduce the viscosity of the composition by at least 10% compared to the viscosity of a composition comprising component a), but not comprising an effective amount of component b).

Specifically, the composition comprises from 1 to 15 wt. %, based on the total weight of the composition, of component b1), and from 3 to 25 wt. %, based on the total weight of the composition, of component b2).

In another specific embodiment, the thermoplastic polymer component is a combination of at least one polycarbonate and at least one polyester, wherein the weight percent of polycarbonate, based on the total weight of the thermoplastic polymer component, is greater than 50%.

Still further, the metal of the metal oxide and the metal of the metal alkoxide components, can be the same or different, and can be, for example, transition metals selected from the group consisting of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, ununbium, and combinations thereof. The metalloid of the metalloid oxide and the metalloid of the metalloid alkoxide component can be the same or different, and can be selected from the group consisting of boron, silicon, germanium, arsenic, antimony, tellurium, polonium, and combinations thereof. Specifically, the metalloid oxide is selected from the group consisting of antimony oxides, boron oxides, sodium antimony oxides, sodium boron oxides, and combinations thereof.

The mineral filler component can comprise a mineral filler selected from the group consisting of aluminum silicate, calcium carbonate, calcium sulfate dihydrate, calcium sulfate hemihydrate, calcinated clay, calcium silicate, clay, crushed quartz, diatomaceous earth, fly ash, kaolin, limestone, mica, silicates, talc, titanium dioxide, wollastonite, zirconium oxide, zirconium silicate, and combinations thereof. Specifically, the miner filler is talc, even more specifically the mineral filler has an average particle size D50 in the range from 0.1 to 4.5 μm.

In a preferred embodiment, the composition further comprises c) from 0.01 to 50 wt. %, based on the total weight of the composition, of an at least partially brominated polymer, for example an at least partially brominated polycarbonate.

Still further, the composition can further comprise an effective amount of an additive selected from the group consisting of acid quenchers, anti-dripping agents, antioxidants, flow modifiers, release agents, UV stabilizers, and combinations thereof.

Another embodiment relates to a composition comprising: a) from 20 to 50 wt. %, based on the total weight of the composition, of bisphenol-A polycarbonate resin; b) from 10 to 45 wt. %, based on the total weight of the composition, of polybutylene terephthalate; c) from 3 to 20 wt. %, based on the total weight of the composition, of a mineral filler; d) from 3 to 15 wt. %, based on the total weight of the composition, of a core-shell impact modifier; e) from 5 to 40 wt. %, based on the total weight of the composition, of an at least partially brominated polymer; f) from 1 to 10 wt. %, based on the total weight of the composition, of antimony oxide; and g) from 0 to 5 wt. %, based on the total weight of the composition, of a polytetrafluoroethylene-containing polymer component. Preferably, the mineral filler is talc. Particularly preferably, the mineral filler has an average particle size D50 in the range from 0.1 to 4.5 μm. Preferably, the core-shell impact modifier is selected from the group consisting of methylmethacrylate-butadiene-styrene, acrylonitrile-butadiene-styrene, acrylic copolymers, and combinations thereof. Preferably, the brominated polycarbonate is at least partially brominated bisphenol-A polycarbonate.

According to another embodiment, it has been surprisingly discovered that the addition of an FR package containing at least partially brominated polycarbonate, as well as an antimony oxide synergist and a PTFE anti-drip agent, gives significant flow improvements compared to the original formulation, whereas poorer flow properties would be expected from prior art because of the presence of the relatively stiffer (higher viscosity) brominated polycarbonate. Furthermore, enhanced heat properties, such as heat distortion and Vicat temperature are obtained, because of the higher glass transition temperature of the at least partially brominated polycarbonate. The flow improvements are similar to those obtained upon addition of a similar FR package containing brominated oligomer, such as the well-known tetrabromobisphenol A (TBBPA) instead of brominated polycarbonate. This however, is expected to give improved flow characteristics, because low molecular weight material is added, which acts as a flow promoter. However, the lower glass transition temperature of these oligomers also significantly lowers the heat properties. Therefore, a particularly preferred composition comprises a mineral-filled thermoplastic polymer composition with an FR package containing partially brominated polycarbonate and antimony oxide. This particularly preferred composition yields a unique combination of FR properties (UL-94 V0 rating down to a thickness of 0.8 mm), stiffness, high heat properties and excellent flow characteristics.

In another embodiment, a method for enhancing the flow of a composition comprising from 30 to 95 wt. %, based on the total weight of the composition, of a thermoplastic polymer component selected from the group consisting of polycarbonates, polyesters, and combinations thereof, comprises: adding an effective amount of a flow-enhancing component to the composition, wherein the flow-enhancing component comprises: i) a component selected from the group consisting of metal oxides, metalloid oxides, metal alkoxides, metalloid oxides, and combinations thereof, and ii) a mineral filler component, wherein the weight ratio of component i) to component ii) ranges from 1:25 to 25:1, wherein the method reduces the viscosity of the composition by at least 10%.

The invention is further described in the following illustrative examples in which all parts and percentages are by weight unless otherwise indicated.

EXAMPLES

Table 1 provides a summary of the materials used in the following examples.

TABLE 1

| Component | Chemical Description | Source/Vendor |
|---|---|---|
| PC105 | Bisphenol A Polycarbonate resin, interfacial polymerization, weight average molecular weight (Mw) about 30,000 g/mol [CAS: 25971-63-5] | SABIC Innovative Plastics |
| PBT315 | Polybutylene terephthalate, IV 1.19 [CAS: 30965-26-5] | BASF |
| PBT195 | Polybutylene terephthalate, IV 0.66 [CAS: 30965-26-5] | BASF |
| JETFINE 3CA | Talc (Magnesium Silicate Hydrate; $Mg_3((OH)_2Si_4O_{10})$), particle size, d50: 1.1 micrometer [CAS: 14807-96-6] | Luzenac |
| MICA SFG-20 | Potassium-aluminum-silicate-hydrate [CAS: 1327-44-2] | Quartzwerke GmbH |
| PARALOID EXL-2650A | MBS core-shell impact modifier, methylmethacrylate-butadiene-styrene [CAS: 25053-09-2] | Rohm & Haas |
| PC105B | Brominated bisphenol A polycarbonate, Br content about 26 wt %, Mw about 24,000 g/mol, Tg of about 185° C., [CAS: 156042-31-8] | SABIC Innovative Plastics |
| BC52 | Tetrabromo-BPA-PC oligomer, phenol capped, 52% Br [CAS: 94334-64-2] | Great Lakes |
| SB2O3 (Masterbatched) | $Sb_2O_3$ masterbatch, 80% in PBT195, [CAS: 1309-64-4] | Campine |
| TSAN | PTFE-SAN, PTFE/E-SAN 50/50 [CAS: 9002-84-0] | SABIC Innovative Plastics |
| MZP | Monozinc phosphate dihydrate [CAS: 13598-37-3] | Chimstar |
| AO1010 | Pentaerythritol- tetrakis(3-(3,5-di-tert-butyl-4-hydroxy-phenyl-)propionate) [CAS: 6683-19-8] | Great Lakes |
| PETS | Pentaerythritol tetrastearate, greater than 90% esterified [CAS: 115-83-3] | FACI |
| PELTP | Pentaerythritol tetrakis(3-laurylthiopropionate) [CAS: 29598-76-3] | Crompton |

Procedures

The components of the example and comparative examples shown below in Tables were extruded on a 25 mm Werner Pfleiderer Twin Screw Extruder with a vacuum vented mixing screw, at a barrel and die head temperature between 240 and 275° C. and 150 to 300 rpm screw speed. The extruder had three independent feeders for different raw materials. The extrudate was cooled through a water bath prior to pelletizing. Test parts were injection molded on an Engel 110T-molding machine with a set temperature of approximately 240 to 265° C. The pellets were dried for 2 hours at 110° C. in a forced air-circulating oven prior to injection molding.

Testing Procedures

The following testing procedures were used. Capillary viscosity, which is an indicator of melt-flow, was measured by ISO 11443. Dried pellets were extruded through a Capillary Rheometer and the force at varied shear rates was determined to estimate the shear viscosity.

Tensile properties were tested according to ISO 527 on 150×10×4 mm (length×width×thickness) injection molded bars at 23° C. with a crosshead speed of 5 mm/min. Izod notched impact was measured at 23° C. with a pendulum of 5.5 Joule on 80×10×4 mm (length×width×thickness) impact bars according to ISO 180/1A method.

Vicat Temperature was measured according to ISO 306.
A synopsis of all the relevant tests and test methods is given in Table 2.

TABLE 2

Test Methods and Descriptions

| | Test Standard | Default Specimen Type | Units |
|---|---|---|---|
| ISO Tensile Test | ISO 527 | Multi-purpose ISO 527 | MPa |
| ISO Izod at Room Temperature | ISO 180/1A | Multi-purpose ISO 3167 Type A | $kJ/m^2$ |
| ISO Vicat Softening Temp | ISO 306 | Bar—80 × 10 × 4 mm | ° C. |
| ISO Melt Viscosity | ISO 11443 | Pellets | Pa · s |

Comparative Examples 1 and 2 and Example 3

As demonstrated in these examples, it has been surprisingly discovered that the flow improvements are achieved using antimony oxide and a mineral filler in polycarbonate/polyester blends.

Materials: For description, see general overview materials.

Table 3 summarizes the compositions employed in Comparative Examples 1 to 2 and Example 3. Compositions are given in percent by weight based on the total weight of the composition.

TABLE 3

| COMPONENT | Comp. Ex. 1 | Comp. Ex. 2 | Ex. 3 |
|---|---|---|---|
| PC105 | 49.69 | 44.85 | 42.76 |
| PBT315 | 25.42 | 22.94 | 21.87 |
| PBT195 | 13.88 | 12.53 | 11.94 |
| JETFINE TALC | | 7.5 | 7.5 |
| MBS | 10.5 | 10.5 | 10.5 |
| $SB_2O_3$ (MB) | | | 3.75 |
| ADDITIVES | 0.51 | 1.68 | 1.68 |

Techniques/Procedures: see general description above.
Results: Table 4 summarizes the results of Examples 1-3.

TABLE 4

| PROPERTY | Comp. Ex. 1 | Comp. Ex. 2 | Ex. 3 |
|---|---|---|---|
| MV, 270° C., 1500 $s^{-1}$ | 305 | 350 | 260 |
| Delta MV compared to C. Ex. 1 | — | +15% | −15% |

Comparative Example 2 shows that the addition of mineral filler to the original composition of Comparative Example 1 gave an increased melt viscosity and, hence, poorer flow properties. However, the addition of both antimony oxide and mineral filler (Example 3) to the composition of Comparative Example 1 yielded a lower melt viscosity and, hence, flow improvement compared to the original composition in Example 1. This clearly demonstrates that the combination of antimony oxide and mineral filler acts to improve flow properties of these compositions.

Comparative Example 4, and Examples 5 to 6

As demonstrated in these examples, it has been surprisingly discovered that even in the presence of an FR agent, the combination of mineral filler, and a component selected from the group consisting of metal oxides, metalloid oxides, metal alkoxides, metalloid alkoxides, and combinations thereof, provides enhanced flow properties. These examples also demonstrate results for different mineral fillers (Examples 5 and 6).

Materials: For description, see general overview materials.

Table 5 summarizes the compositions employed in Comparative Example 4 and in Examples 5 to 6. Compositions are given in percent by weight based on the total weight of the composition.

TABLE 5

| COMPONENT | Comp. Ex. 4 | 5 | 6 |
|---|---|---|---|
| PC105 | 29.85 | 27.76 | 27.76 |
| PBT315 | 22.94 | 21.86 | 21.86 |
| PBT195 | 12.53 | 11.94 | 11.94 |
| JETFINE TALC | 7.5 | 7.5 | |
| MICA | | | 7.5 |
| MBS | 10.5 | 10.5 | 10.5 |
| PC105B | 15 | 15 | 15 |
| SB$_2$O$_3$ (MB) | | 3.75 | 3.75 |
| ADDITIVES | 1.68 | 1.69 | 1.69 |

Techniques/Procedures: see general description above.

Results: Table 6 summarizes the results of Comparative Example 4, and Examples 5 to 6.

TABLE 6

| Properties | Comp. Ex. 4 | Ex. 5 | Ex. 6 |
|---|---|---|---|
| MV, 270° C., 1500 s$^{-1}$ | 330 | 280 | 280 |
| Delta MV compared to Comp. Ex. 4 | — | −18% | −18% |

Example 5 shows that the addition of antimony oxide to the original composition in Comparative Example 4, comprising polycarbonate, polyester, mineral filler and brominated polycarbonate, resulted in about 18% flow improvement. Different mineral fillers in Examples 5 and 6, namely talc and mica, gave similar flow improvements compared to the original composition in Comparative Example 4.

Comparative Example 2, Example 5, and Comparative Examples 7 to 8.

As demonstrated in these examples, the flow improvement upon addition of antimony oxide to compositions containing brominated polymers was only obtained if the composition also contains a mineral filler.

Materials: For description, see general overview materials.

Table 7 summarizes the compositions employed in Comparative Example 2, Example 5, and Comparative Examples 7 to 8. Compositions are given in percent by weight based on the total weight of the composition.

TABLE 7

| COMPONENT | Comp. Ex. 2 | Ex. 5 | Comp. Ex. 7 | Comp. Ex. 8 |
|---|---|---|---|---|
| PC105 | 44.85 | 27.76 | 49.69 | 32.04 |
| PBT315 | 22.94 | 21.86 | 25.42 | 24.06 |
| PBT195 | 12.53 | 11.94 | 13.88 | 13.14 |
| JETFINE TALC | 7.5 | 7.5 | | |
| MBS | 10.5 | 10.5 | 10.5 | 10.5 |
| PC105B | | 15 | | 15 |
| SB$_2$O$_3$ MB | | 3.75 | | 3.75 |
| ADDITIVES | 1.68 | 1.69 | 0.51 | 1.51 |

Techniques/Procedures: see general description above.

Results: Table 8 summarizes the results of Comparative Example 2, Example 5, and Comparative Examples 7 to 8.

TABLE 8

| Properties | Comp. Ex. 2 | Ex. 5 | Comp. Ex. 7 | Comp. Ex. 8 |
|---|---|---|---|---|
| MV, 270° C., 1500 s$^{-1}$ | 350 | 280 | 305 | 290 |
| Delta MV | — | −21% (vs. Comp. Ex. 2) | — | −5% (vs. Comp. Ex. 7) |

Example 5 demonstrates that the addition of antimony oxide and brominated polycarbonate to the composition of Comparative Example 1 yields an about 21% flow improvement compared to the original composition containing a mineral filler. However, the addition of the same amounts of antimony oxide and brominated polycarbonate (Comparative Example 8) to a composition without mineral filler (Comparative Example 7) does not yield a significant flow improvement relative to the original composition in Comparative Example 7. These results demonstrate that only the combination of the component selected from the group consisting of metal oxides, metalloid oxides, metal alkoxides, metalloid alkoxides, and the mineral filler yield the flow improvement.

Comparative Example 9, Examples 10 to 13, and Comparative Example 14.

These examples demonstrate that the addition of brominated polymer and antimony oxide to a composition comprising polycarbonate, polyester, and mineral filler yields a unique combination of good flame-retardant properties, high modulus, good impact properties and good retention of heat properties.

Materials: For description, see general overview materials.

Table 9 summarizes the compositions employed in Comparative Example 9, Examples 10 to 13, and Comparative Example 14. Compositions are given in percent by weight based on the total weight of the composition.

TABLE 9

| | Comp. Ex 9 | Ex. 10 | Ex. 11 | Ex. 12 | Ex. 13 | Comp. Ex. 14 |
|---|---|---|---|---|---|---|
| PC105 | 44.85 | 33.45 | 27.76 | 22.06 | 16.36 | 38.43 |
| PBT315 | 22.93 | 22.22 | 21.86 | 21.50 | 21.15 | 19.65 |
| PBT195 | 12.53 | 12.14 | 11.94 | 11.75 | 11.55 | 10.74 |
| Jetfine 3CA | 7.50 | 7.50 | 7.50 | 7.50 | 7.50 | 7.50 |
| MBS | 10.50 | 10.50 | 10.50 | 10.50 | 10.50 | 10.50 |

TABLE 9-continued

|  | Comp. Ex 9 | Ex. 10 | Ex. 11 | Ex. 12 | Ex. 13 | Comp. Ex. 14 |
|---|---|---|---|---|---|---|
| PC105B |  | 10.00 | 15.00 | 20.00 | 25.00 |  |
| TBBPA oligomer |  |  |  |  |  | 8.00 |
| SB$_2$O$_3$ (MB) |  | 2.50 | 3.75 | 5.00 | 6.25 | 3.50 |
| Additives | 1.69 | 1.69 | 1.69 | 1.69 | 1.69 | 1.69 |

Techniques/Procedures: see general description above

Results: Table 10 summarizes the results of Comparative Example 9, Examples 10 to 13, and Comparative Example 14.

TABLE 10

| PROPERTIES | Comp. Ex 9 | Ex. 10 | Ex. 11 | Ex. 12 | Ex. 13 | Comp. Ex. 14 |
|---|---|---|---|---|---|---|
| MV, 270° C., 1500 s$^{-1}$ | 318 | 238 | 229 | 220 | 234 | 210 |
| Delta MV compared to Comp. Ex. 9 | — | −25 | −28 | −31 | −26 | −34 |
| Tensile modulus | 3100 | 3100 | 3150 | 3200 | 3250 | 3150 |
| Izod notched impact at 23° C. | 55 | 46 | 41 | 35 | 16 | 39 |
| Vicat B120 | 133 | 130 | 134 | 138 | 141 | 122 |
| UL-94 V-rating at 1.5 mm | V2 | V2 | V0 | V0 | V0 | V0 |

Examples 10 to 13 show that the addition of brominated polycarbonate and antimony oxide in a wide range of contents to the original formulation in Comparative Example 9, comprising polycarbonate, polyester and mineral filler, gives flow improvement (about 25-31%) compared to the original composition. This demonstrates that the flow improvement relative to the original formulation is achieved over a wide range of compositions Examples 11 to 12 show that the addition of high enough amounts of brominated polycarbonate and antimony oxide give UL-94 V-0 performance, with retention or improvement of heat properties (Vicat temperature) and sufficient retention of impact properties, as well as flow improvement, compared to the original composition (Comparative Example 9). Comparative Example 14 shows that the addition of sufficient amounts of TBBPA oligomer and antimony oxide to achieve V-0 rating to the composition of Comparative Example 9 gave a similar flow improvement to those for brominated polycarbonate and antimony oxide (Examples 11 to 12). However, the addition of TBBPA oligomer lowered the heat properties compared to the original composition (Comparative Example 9, about 9° C.) and, especially, the compositions in Example 10 to 13 (up to 20° C.). Therefore, Examples 10 to 11 demonstrate that the compositions comprising polycarbonate, polyester, mineral filler, brominated polycarbonate, and antimony oxide yielded a unique combination of flame-retardant characteristics, high modulus, high heat properties, sufficiently retained impact properties and improved flow characteristics.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features. Although the present invention has been described in considerable detail with reference to certain preferred versions thereof, other versions are possible. Therefore, the spirit and scope of the appended claims should not be limited to the description of the preferred versions contained herein.

What is claimed is:

1. A composition comprising:
   a) from 20 to 50 wt. %, based on the total weight of the composition, of bisphenol-A polycarbonate resin;
   b) from 10 to 45 wt. %, based on the total weight of the composition, of polybutylene terephthalate;
   c) from 3 to 20 wt. %, based on the total weight of the composition, of a mineral filler;
   d) from 3 to 20 wt. %, based on the total weight of the composition, of a core-shell impact modifier;
   e) from 5 to 40 wt. %, based on the total weight of the composition, of an at least partially brominated polymer;
   f) from 1 to 10 wt. %, based on the total weight of the composition, of antimony oxide; and
   g) from 0 to 5 wt. %, based on the total weight of the composition, of a polytetrafluoroethylene-containing polymer component, wherein the weight ratio of component f to component c ranges from 1:25 to 25:1, wherein the composition has a melt viscosity at least 10% less than same composition not comprising component c and component f.

2. The composition of claim 1, wherein the mineral filler is talc.

3. The composition of claim 1, wherein the mineral filler has an average particle size D50 in the range from 0.1 to 4.5 µm.

4. The composition of claim 1, wherein the at least partially brominated polymer is a partially brominated bisphenol-A polycarbonate.

5. The composition of claim 1, wherein the core-shell impact modifier is selected from the group consisting of methylmethacrylate-butadiene-styrene, acrylonitrile-butadiene-styrene, acrylic copolymers, and combinations thereof.

* * * * *